(12) United States Patent
Capron et al.

(10) Patent No.: US 12,043,366 B2
(45) Date of Patent: Jul. 23, 2024

(54) AIRCRAFT DOOR WITH ADJUSTABLE SUPPORT ARM HINGES

(71) Applicant: LATECOERE, Toulouse Occitaine (FR)

(72) Inventors: Nicolas Capron, Castanet Tolosan (FR); Gregory Dubosc, Girolles Occitanie (FR); Jean Batiste Salles, Saint Sulpice (FR)

(73) Assignee: LATECOERE, Toulouse Occitanie (FR)

( * ) Notice: Subject to any disclaimer, the term of this patent is extended or adjusted under 35 U.S.C. 154(b) by 265 days.

(21) Appl. No.: 17/619,009

(22) PCT Filed: Jun. 12, 2020

(86) PCT No.: PCT/EP2020/025276
§ 371 (c)(1),
(2) Date: Dec. 14, 2021

(87) PCT Pub. No.: WO2020/253987
PCT Pub. Date: Dec. 24, 2020

(65) Prior Publication Data
US 2022/0348304 A1    Nov. 3, 2022

(30) Foreign Application Priority Data
Jun. 15, 2019   (FR) ...................... 1906435

(51) Int. Cl.
*B64C 1/14*    (2006.01)
*E05D 3/06*    (2006.01)
(Continued)

(52) U.S. Cl.
CPC ............ *B64C 1/143* (2013.01); *B64C 1/1461* (2013.01); *E05D 3/06* (2013.01); *E05D 15/34* (2013.01);
(Continued)

(58) Field of Classification Search
CPC ......... B64C 1/143; B64C 1/1461; E05D 3/06; E05D 15/34; E05Y 2900/502
See application file for complete search history.

(56) References Cited

U.S. PATENT DOCUMENTS 3,791,073 A * 2/1974 Baker ..................... B64C 1/143
                                                                49/40
5,289,615 A * 3/1994 Banks ..................... E05D 3/122
                                                                244/905

(Continued)

FOREIGN PATENT DOCUMENTS

| DE | 19730918 | 1/1999 |
|---|---|---|
| EP | 1227034 | 7/2002 |

(Continued)

*Primary Examiner* — Joshua J Michener
*Assistant Examiner* — Cindi M Curry
(74) *Attorney, Agent, or Firm* — Defillo & Associates, Inc.; Evelyn A. Defillo

(57) ABSTRACT

The invention relates to an aircraft door having a support arm (6) connected to a support forearm (9) by a first pivot connection (7) about a first pivot axis (8), the support forearm (9) being connected to the leaf (5) by a second pivot connection (10) about a second pivot axis (11) parallel to the first pivot axis (8). The support arm (6) is connected to the door frame (4) by two hinges (13, 14) each having a pivot (26, 27) for rotating the support arm (6) about a third pivot axis (12) which is parallel to the first pivot axis (8) and to the second pivot axis (11), this pivot (26, 27) being connected to the door frame (4) by an attachment (22, 23) that is translatably adjustable in two directions (35, 37, 43, 47) orthogonal to one another and orthogonal to the third pivot axis (12).

14 Claims, 7 Drawing Sheets

(51) Int. Cl.
  *E05D 7/04* (2006.01)
  *E05D 15/34* (2006.01)
(52) U.S. Cl.
  CPC . *E05D 2007/0484* (2013.01); *E05Y 2900/502* (2013.01)

(56) References Cited

U.S. PATENT DOCUMENTS

| | | | | |
|---|---|---|---|---|
| 2006/0202087 | A1* | 9/2006 | Mortland | B64C 1/1407 |
| | | | | 244/129.5 |
| 2011/0041290 | A1* | 2/2011 | Herglotz | E05D 3/18 |
| | | | | 16/375 |
| 2017/0174354 | A1* | 6/2017 | Ciprian | B64D 29/08 |
| 2021/0323654 | A1* | 10/2021 | Gildas | E05D 3/147 |

FOREIGN PATENT DOCUMENTS

| | | |
|---|---|---|
| EP | 2325425 | 5/2011 |
| FR | 1859376 | 4/2020 |

* cited by examiner

AIRCRAFT DOOR WITH ADJUSTABLE SUPPORT ARM HINGES

CROSS REFERENCE TO RELATED APPLICATION

This application is a national stage entry of PCT/EP2020/025276 filed Jun. 12, 2020, under the International Convention and claiming priority over French Patent Application No. FR1906435 filed Jun. 15, 2019.

TECHNICAL FIELD

The invention relates to the field of aeronautics and relates more particularly to an aircraft door provided with means permitting the adjustment in particular of the position of the leaf of the door with respect to the fuselage of the aircraft when the door is in a closed position.

PRIOR ART

Known aircraft doors generally have:
a leaf comprising a door structure to which an external wall is fixed;
a surround comprising a door frame intended to be fixed to the fuselage of the aircraft;
a support arm of the leaf having an end mounted pivotably on the door frame, this support arm being movable between a closed position, in which the leaf closes the door frame, and an open position, in which the leaf is released from the door frame.

It is known from patent document EP 1 227 034 that the support arm is connected to the door frame by two hinges each comprising a pivot for rotation of the support arm about a pivot axis, and is connected to a forearm by a first pivot connection, the forearm being connected to the leaf by a second pivot connection. These pivot connections only allow rotation about pivot axes that are parallel to the pivot axis of the support arm's rotation pivots. However, the position of the leaf in relation to the frame is not made adjustable in this solution.

Moreover, these doors are generally provided with means permitting adjustment of the position of the leaf with respect to the surround, for example in order to optimally align the external wall of the leaf with the fuselage of the aircraft. These means are generally formed by fixtures permitting adjustment play between the various elements of the aircraft door. The various fixtures present on the surround, on the leaf and on the support arm can therefore be loosened in order to move the support arm and the leaf to the appropriate position. These fixtures are then tightened again in order to lock this position.

These adjustment operations, necessary in the case of the aircraft doors of the prior art, are lengthy and awkward, and they require the involvement of several operators, some of whom are tasked with supporting the components of the door while others tighten and loosen the fixtures. Moreover, optimal fitting of these aircraft doors requires several repeat adjustments, since the movement of each fixture influences the adjustment of the other fixtures. These aircraft doors also have a large number of component parts allowing their adjustment.

DISCLOSURE OF THE INVENTION

The object of the invention is to improve the aircraft doors of the prior art in terms of their adjustability and fitting in an aircraft.

To this end, the invention relates to an aircraft door having:
a leaf comprising a door structure to which an external wall is fixed;
a surround comprising a door frame intended to be fixed to the fuselage of the aircraft;
a support arm of the leaf having an end mounted pivotably on the door frame, this support arm being movable between a closed position, in which the leaf closes the door frame, and an open position, in which the leaf is released from the door frame.

In this aircraft door:
the support arm is connected to a support forearm by a first pivot connection, permitting as sole degree of freedom a rotation between the support forearm and the support arm about a first pivot axis, the support forearm being connected to the leaf by a second pivot connection, permitting as sole degree of freedom a rotation between the leaf and the support forearm about a second pivot axis parallel to the first pivot axis;
the support arm is connected to the door frame by two hinges, each of them having a pivot for rotation of the support arm about a third pivot axis, which is parallel to the first pivot axis and to the second pivot axis, this pivot being connected to the door frame by a fitting that is adjustable in translation in a direction of first translation and in a direction of second translation, these two directions being orthogonal to each other and orthogonal to the third pivot axis.

Such an aircraft door has few parts provided for its adjustment, which reduces the cost of this door and the weight on board the aircraft.

The hinges of the aircraft door according to the invention centralize, at the level of the two adjustable fittings, all of the adjustments permitted to the aircraft door. Only one operator is needed to act on the two adjustable fittings in an easily accessible area of the connection between the support arm and the door frame. This action on the adjustable fittings allows the leaf and the support arm to be adjusted at the same time.

In addition to the lighter weight and the lower cost of the aircraft door, the invention thus permits faster, more precise and simplified adjustment compared to that of the aircraft doors of the prior art.

The term "adjustable" is defined here as the property of an adjustment element to be able to drive in translation or in rotation the leaf of the aircraft door only during the mounting of the door in the aircraft or during maintenance. Apart from these cases, these adjustment elements are blocked, and the aircraft door only has simple pivot connections permitting actuation of the leaf with respect to the surround.

The aircraft door according to the invention can have the following additional features, alone or in combination:
the two hinges are aligned on the support arm in such a way that the rotation pivots of the support arm are aligned along the third pivot axis;
the rotation pivots of the support arm are adjustable in translation along the third pivot axis;
the rotation pivot of the support arm of one of the hinges has a sliding shaft with which the support arm is in sliding pivot connection; and the rotation pivot of the support arm of the other hinge is connected to the support arm by a disengageable helical adjustment connection;
said rotation pivot of the support arm of the other hinge has: a central shaft mounted on the adjustable fitting and extending along the third pivot axis; a threaded cylinder mounted rotatably on the central shaft; an internally threaded sleeve screwed onto the threaded cylinder and fixed to the support arm;

the threaded cylinder is stopped in rotation by a removable flange coming into abutment against the support arm;

the hinges each have a base fixed to the door frame, the adjustable fitting of each hinge being mounted in the corresponding base;

the adjustable fitting of each hinge passes through a wall of the door frame;

the adjustable fitting of each hinge has a shoe mounted in the base, and a yoke connecting the shoe to the rotation pivot of the support arm;

the yoke of each hinge is adjustable in translation with respect to the shoe, in a direction of first translation which is orthogonal to and intersects the third pivot axis;

the yoke of each hinge is in helical connection with the shoe;

the yoke of each hinge has: a rotating threaded portion mounted in a threaded bore of the shoe; and an actuation head accessible from the base;

the shoe of each hinge is adjustable in translation in a direction of second translation, which is orthogonal to the third pivot axis and to the direction of first translation;

the shoe is mounted on the base by way of: a guide shaft extending parallel to the direction of second translation; an adjustment screw extending parallel to the direction of second translation, which is in pivot connection with the base and which is in helical connection with the shoe;

the door comprises a pivoting link and a pivoting front link connected to each other by a pivot connection, and the adjustable fitting of one of the hinges has a pivot for the pivoting link;

the door comprises a mechanism of opening by lateral escape, all of the parts connecting the leaf to the door frame being articulated solely by pivot connections along axes parallel to the first pivot axis.

DESCRIPTION OF THE FIGURES

Other features and advantages of the invention will become clear from the following non-limiting description, with reference to the accompanying drawings in which.

DETAILED DESCRIPTION

Figure 1:
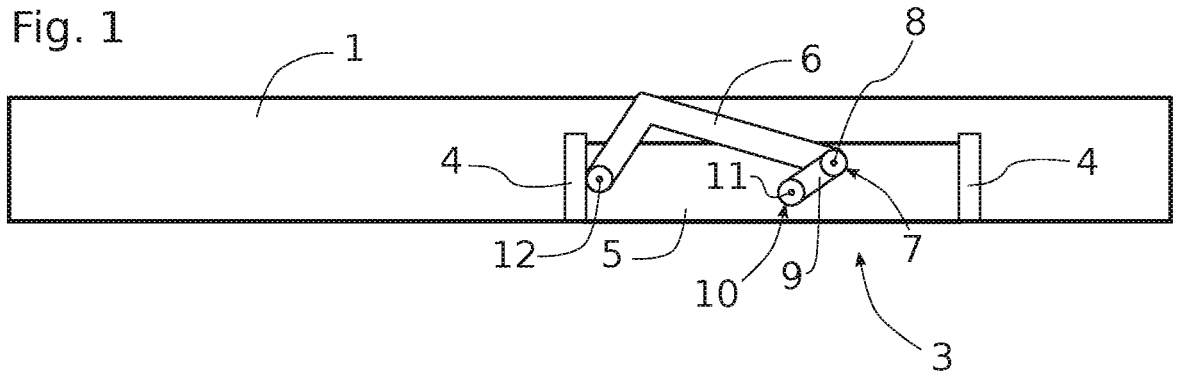
FIG. 1 is a schematic representation of an aircraft door in a closed position.
Figure 2:
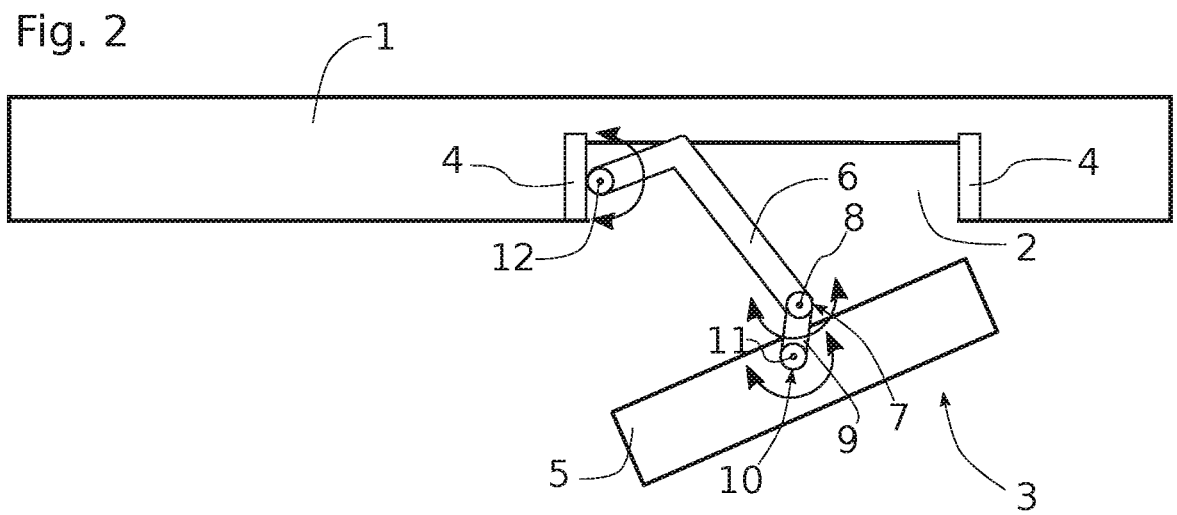
FIG. 2 is a schematic representation of an aircraft door in an intermediate position.
Figure 3:
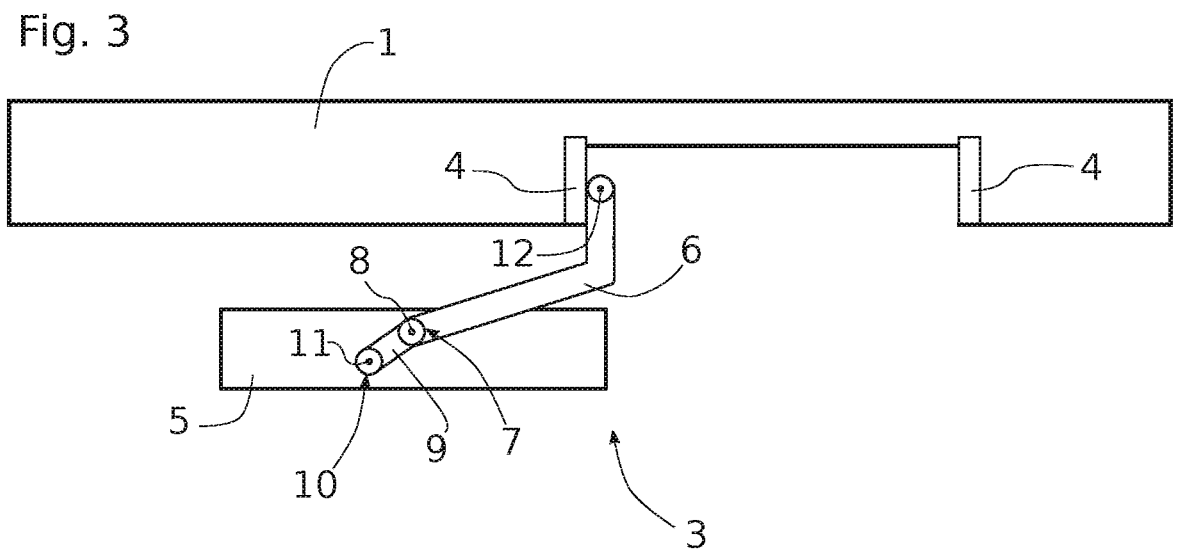
FIG. 3 is a schematic representation of an aircraft door in an open position.

FIGS. 1 to 3 schematically illustrate an aircraft door 3 according to the invention. In these schematic diagrams, the aircraft is seen from above, and a portion of its fuselage 1 has been shown around the aircraft door 3. The fuselage 1 has an opening 2 in which the aircraft door 3 is mounted.

FIGS. 1 to 3 illustrate only the mechanical connections and the possible movements between certain parts and do not illustrate the general kinematic operation of the door 3 in its opening and closing functions.

The aircraft door 3 comprises a surround consisting here of a door frame 4 fixed to the fuselage 1 of the aircraft. The door 3 also comprises a leaf 5 which is connected to the door frame 4 by a support arm 6 and a support forearm 9.

The leaf 5, the support arm 6 and the support forearm 9 are movable between:

a closed position, shown in FIG. 1, in which the leaf 5 closes the frame 4, in particular to allow the flight of the aircraft;

an open position, shown in FIG. 3, in which the leaf 5 is released from the frame 4 to allow access to the interior of the aircraft, to constitute an emergency exit, or any other function of an aircraft door.

FIG. 2 shows an intermediate step between the closed position of FIG. 1 and the open position of FIG. 3. FIG. 2 illustrates the possible mutual movements of the leaf 5, the support arm 6 and the support forearm 9.

The support arm 6 is connected to the forearm 9 by a pivot connection 7, permitting as sole degree of freedom a rotation between the support arm 6 and the support forearm 9 about a first pivot axis 8.

The support forearm 9 is connected to the leaf 5 by a pivot connection 10, permitting as sole degree of freedom a rotation between the leaf 5 and the support forearm 9 about a second pivot axis 11.

FIG. 2 illustrates by arrows the rotations which are the only possible mutual movements for the support arm 6, the support forearm 9 and the leaf 5.

The movements allowed for the leaf 5, and illustrated in FIG. 2, permit the release of the leaf 5 from the locking stops present on the frame 4. The aircraft door 3 is thus advantageously what is called a "lateral escape" door, which is opened by pivoting the leaf about a substantially vertical axis and translating it laterally (that is to say in the longitudinal direction of the aircraft). Such an aircraft door 3 with lateral escape may be, for example, an aircraft door as described in the patent application filed in France on Oct. 10, 2018 under number FR1859376.

Figure 4:
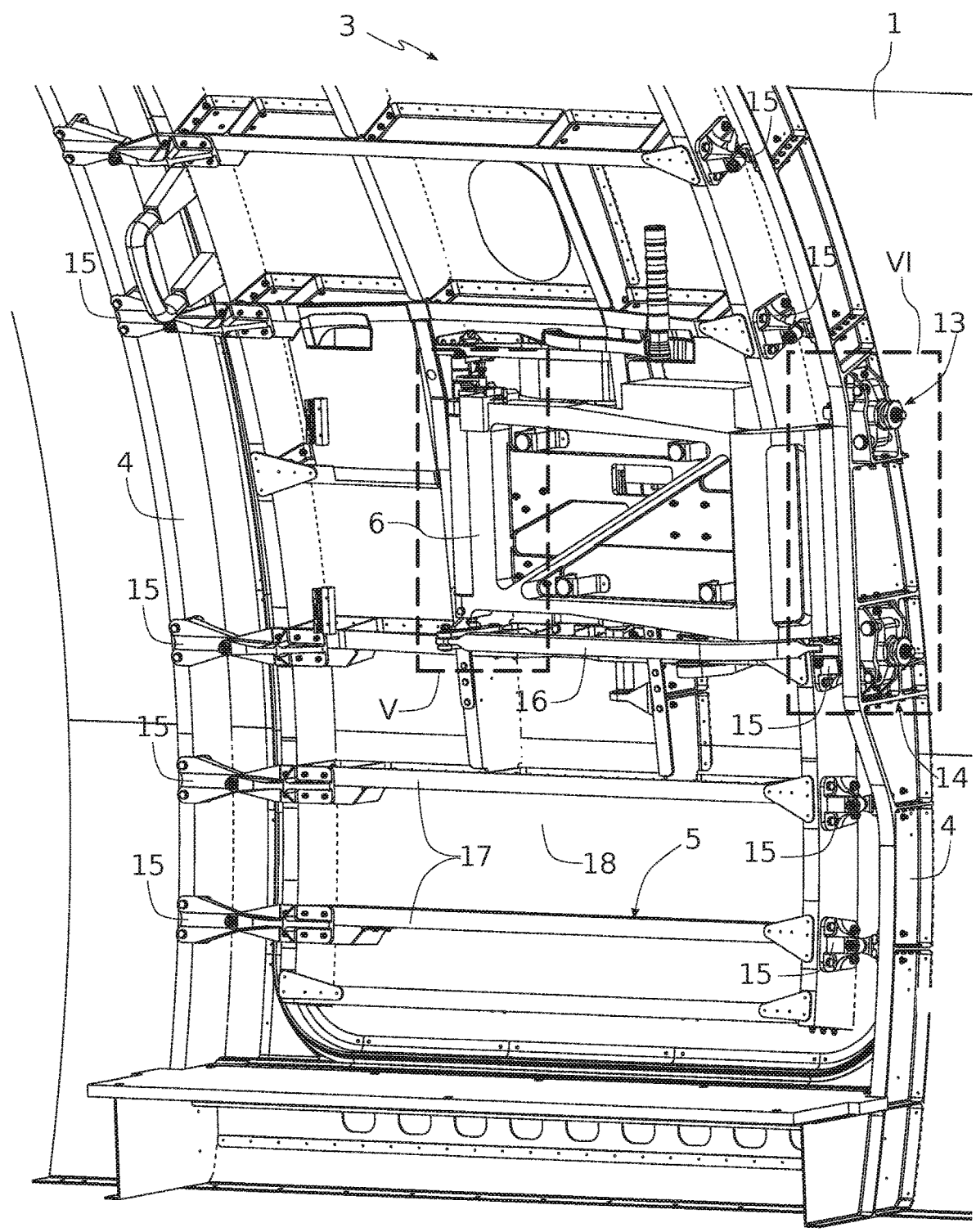
FIG. 4 is a general view of an aircraft door according to the invention.

FIG. 4 is an overview of the aircraft door 3 according to the invention, seen from inside the aircraft. In this figure, the fuselage 1 of the aircraft is visible around the door 3, the door frame 4 being fixed to this fuselage 1.

The leaf 5 consists of a door structure 17, formed in the conventional way by side members and rigid beams, to which is fixed an external wall 18 commonly referred to as a "skin". This external wall 18 is intended to be positioned in alignment with the fuselage 1 of the aircraft when the door 3 is in the closed position. The external wall 18 constitutes, together with the fuselage 1, the external boundary of the aircraft.

The support arm 6 is connected to the frame 4 by hinges 13, 14 permitting the rotation of the support arm 6 with respect to the frame 4 about a third pivot axis 12, which is parallel to the first pivot axis 8 and to the second pivot axis 11 (the third pivot axis 12 is illustrated in particular in FIGS. 1 to 3).

FIG. 4 shows the aircraft door 3 in a closed position and locked by its stops 15. The rotation movements of the support arm 6, of the support forearm 9 and of the leaf 5, about the axes 8, 11, 12, allow the leaf to escape laterally from the stops 15 while the aircraft door is being opened. No vertical movement of the leaf 5 is allowed by the kinematics described here by way of example.

The support arm 6 is here formed of a rigid structure dimensioned to support the weight of the leaf 5. The upper hinge 13 and lower hinge 14 support the weight of the assembly and are adjustable.

Here, the aircraft door 3 moreover has a pivoting link 16 connecting one of the hinges (the lower hinge 14 in the example of FIG. 4) to a pivoting front link 19, itself connected to the door structure 17 of the leaf 5. The pivoting link 16 and the pivoting front link 19 make it possible to orient the rotation of the leaf 5 with respect to the frame 4 during the opening and closing maneuvers.

Figure 5:
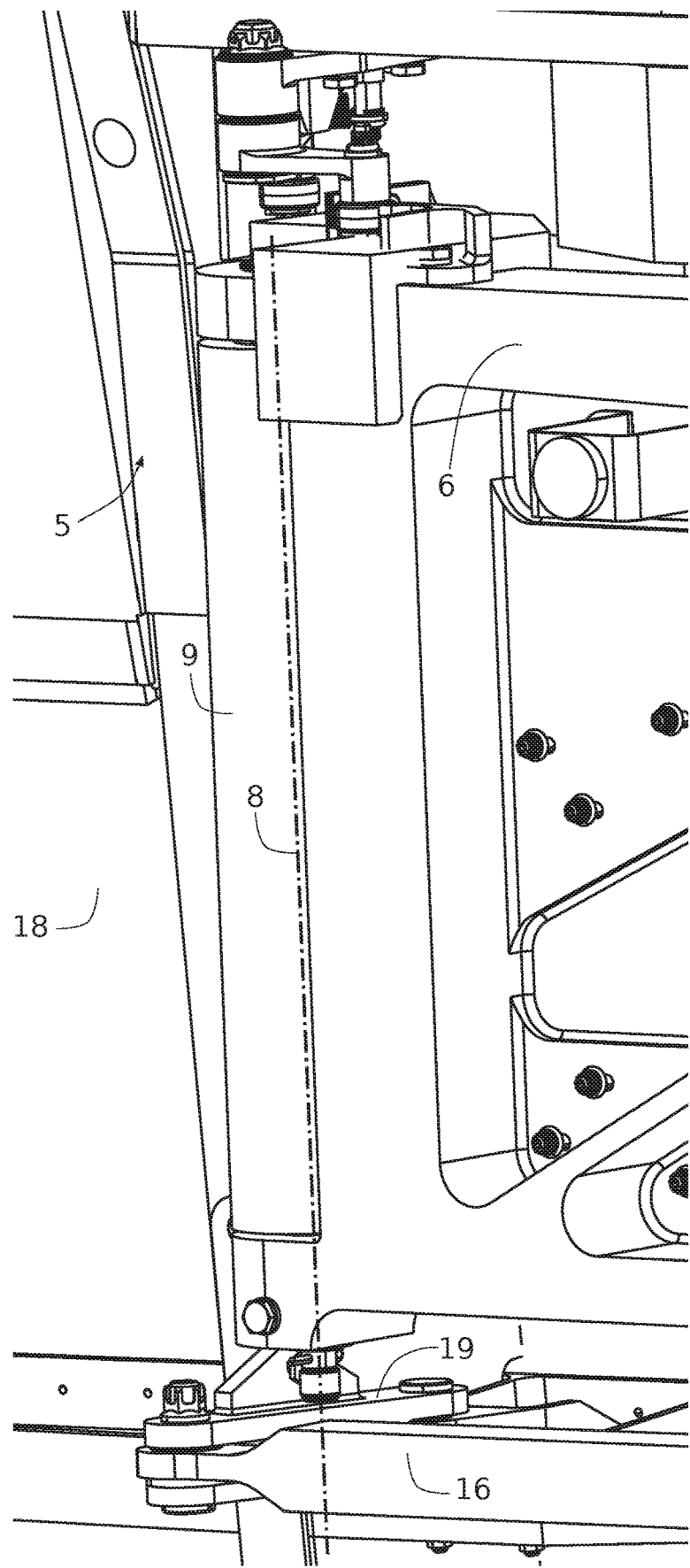
FIG. 5 is an enlarged view of the box V of FIG. 4.

FIG. 5 is an enlarged view of the box V of FIG. 4 and shows in particular the connection between the support arm 6 and the support forearm 9 along the first pivot axis 8. This pivot connection is here formed by a cylindrical articulation of the type with long guiding, ensuring that only the rotation about the first pivot axis 8 is allowed between the support arm 6 and the support forearm 9. A pivot connection of the same type is provided between the support forearm 9 and the door structure 17.

Pivot connections are provided on the one hand between the pivoting link 16 and the pivoting front link 19, and on the other hand between the pivoting front link 19 and the door structure 17. These pivot connections are intended to guide the orientation of the leaf 5 in its movement and not to support the weight of the leaf 5. These pivot connections consist of conventional pivot connections, possibly of ball joints.

Figure 6:
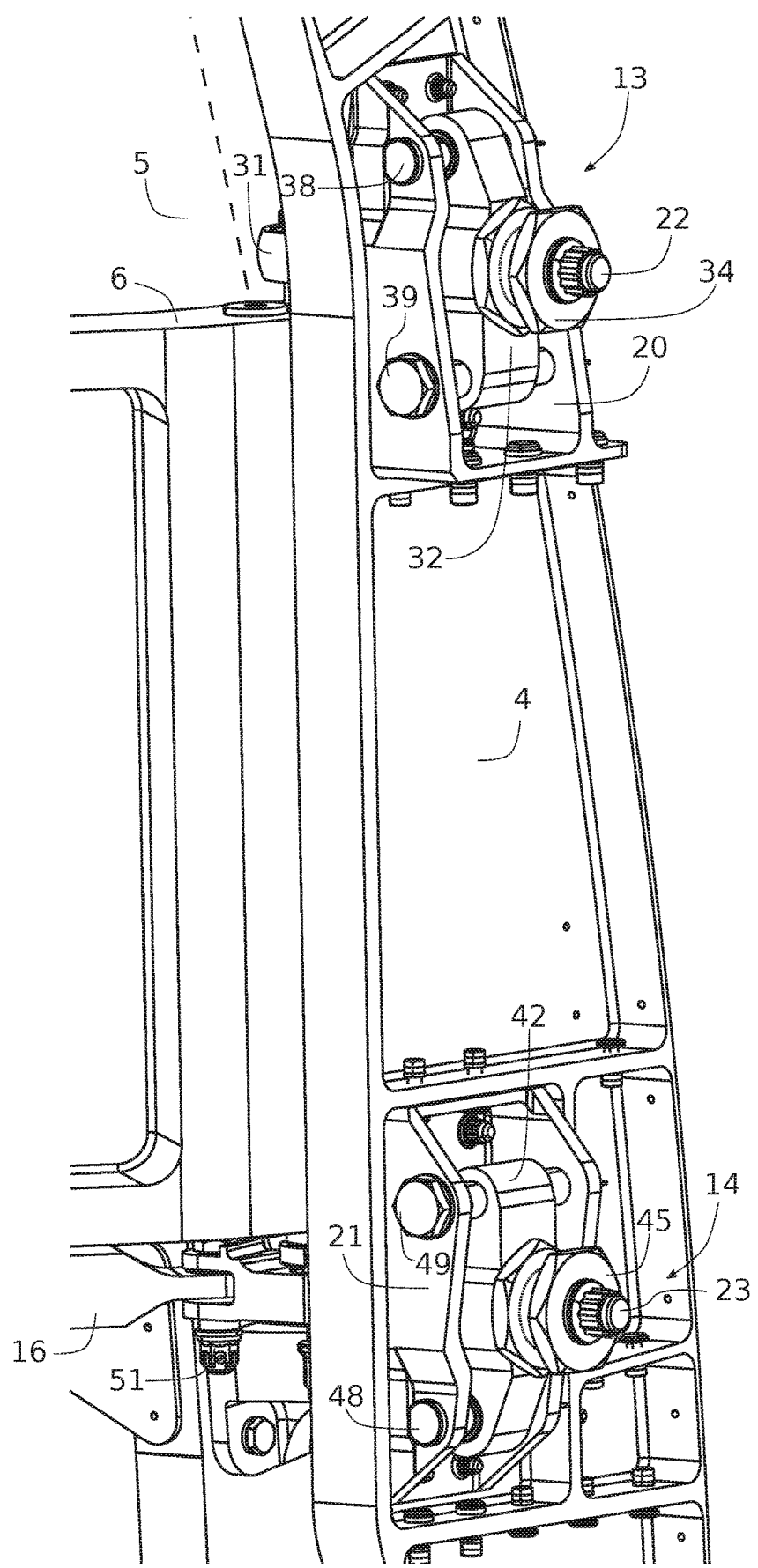
FIG. 6 is an enlarged view of the box VI of FIG. 4.

FIG. 6 is an enlarged view of the box VI of FIG. 4 and shows in particular the hinges 13, 14 connecting the support arm 6 and the pivoting link 16 to the frame 4.

The hinges 13, 14 each comprise a base 20, 21 fixed, for example by bolts, to the frame 4 or integrated directly in the frame 4. For each of the hinges 13, 14, an adjustable fitting 22, 23 is mounted in the base 20, 21.

Figure 7:
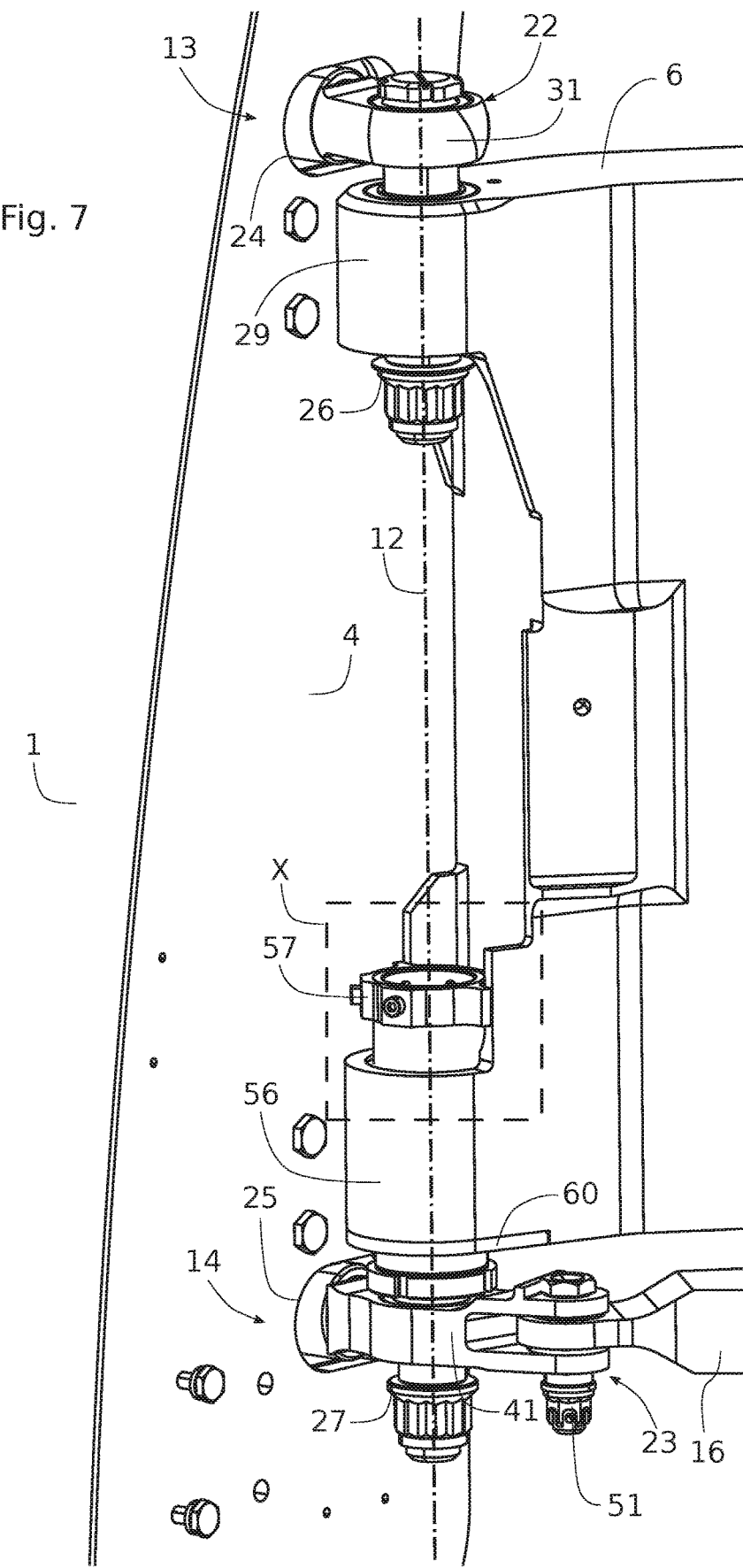
FIG. 7 is a perspective view of the hinges of the aircraft door of FIG. 4, seen from outside the aircraft.

FIG. 7 shows the elements of FIG. 6 from another angle, seen from outside the aircraft. The fittings 22, 23 pass through a wall of the frame 4 via through-holes 24, 25 in order to connect each base 20, 21 to a rotation pivot 26, 27 of the support arm 6, this pivot 26, 27 being attached to the support arm 6 and allowing the rotation of the support arm 6 about the third pivot axis 12.

In the present example, the hinges 13, 14 are aligned along an axis parallel to the first pivot axis 8, such that the upper pivot 26 and the lower pivot 27 are aligned along the third pivot axis 12. In the present description, the hinge 13 above is called the upper hinge 13 and the hinge below is called the lower hinge 14. Likewise, the various component parts of the hinges 13, 14 will be designated as upper or lower, depending on whether they belong to one or other hinge 13, 14.

Figure 8:
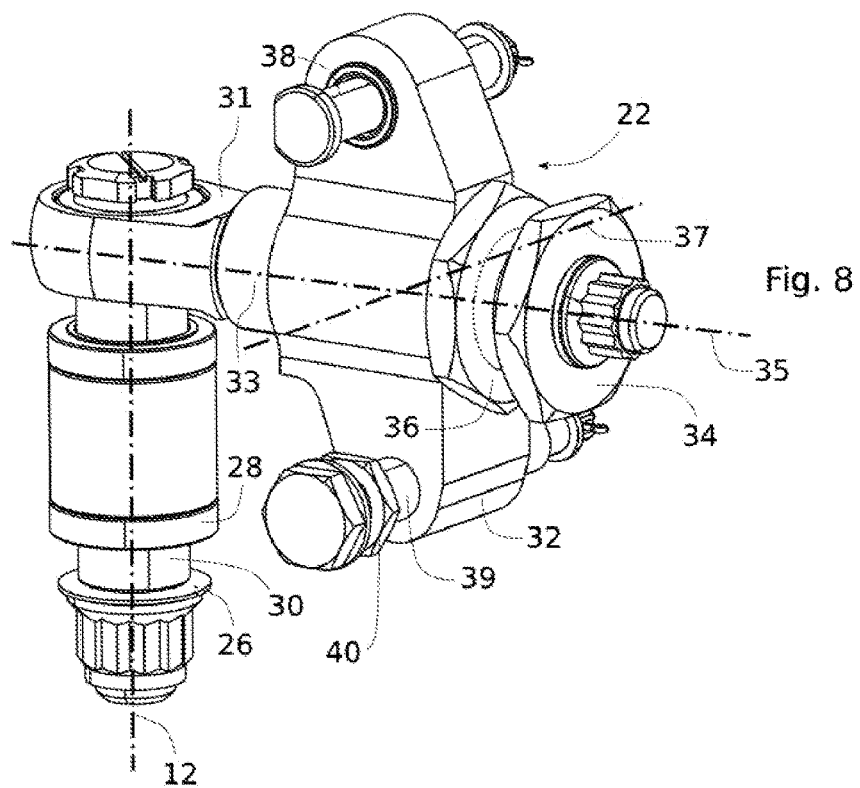
FIG. 8 shows elements of the upper hinge of the aircraft door of FIG. 4.

FIG. 8 shows a perspective view of the assembly formed by the upper pivot 26 and the upper fitting 22 of the upper hinge 13.

The upper pivot 26 has one or more rollers 28, which are mounted tightly in an upper bearing 29 of the support arm 6. These rollers 28 are in sliding pivot connection with a sliding shaft 30, which extends along the third pivot axis 12.

For the connection of the upper pivot 26 to the upper base 20, the upper fitting 22 has a yoke 31 mounted on a shoe 32. The yoke 31 is fixed to the upper pivot 26 and has a threaded rotating portion 33 which is provided at its end with a hexagonal head 34. The threaded rotating portion 33 and the hexagonal head 34 are integral with each other and movable in rotation, about a direction of first translation 35, with respect to the rest of the upper yoke 31. This threaded rotating portion 33 is in helical connection with the shoe 32, which for this purpose has a threaded through-bore. Thus, when the hexagonal head 34 is rotated in one direction or the other, the threaded rotating portion 33 is driven in rotation about the direction of first translation 35, which causes a displacement of the upper yoke 31 in translation along this axis 35. A counter-nut 36 is also provided on the threaded rotating portion 33 in order, when the counter-nut 36 is tightened against the shoe 32, to block and keep the yoke 31 in position in the shoe 32.

The upper shoe 32 is moreover adjustable in translation in a direction of second translation 37, which is orthogonal to the direction of first translation 35. This assembly is carried out by means of a guide shaft 38 parallel to this direction of second translation 37 and fixed on the upper base 20, the upper shoe 32 being mounted with a sliding fit on this guide shaft 38. An adjustment screw 39 completes the action of the guide shaft 38 for maintaining the upper shoe 32 in the upper base 20. The adjustment screw 39 is mounted rotatably in the upper base 20 but immobilized in translation. The upper shoe 32 is helically connected to the adjustment screw 39 by virtue of a threaded through-bore of the upper shoe. The rotation of the screw 39 thus causes the translation, in the direction of second translation 37, of the shoe 32 with respect to the base 20. A counter-nut 40 also makes it possible to immobilize the adjustment screw 39.

The upper hinge 13 can thus be adjusted in translation:
along the direction of first translation 35 by acting on the hexagonal head 34;
along the direction of second translation 37 by acting on the adjustment screw 39.

Figure 9:
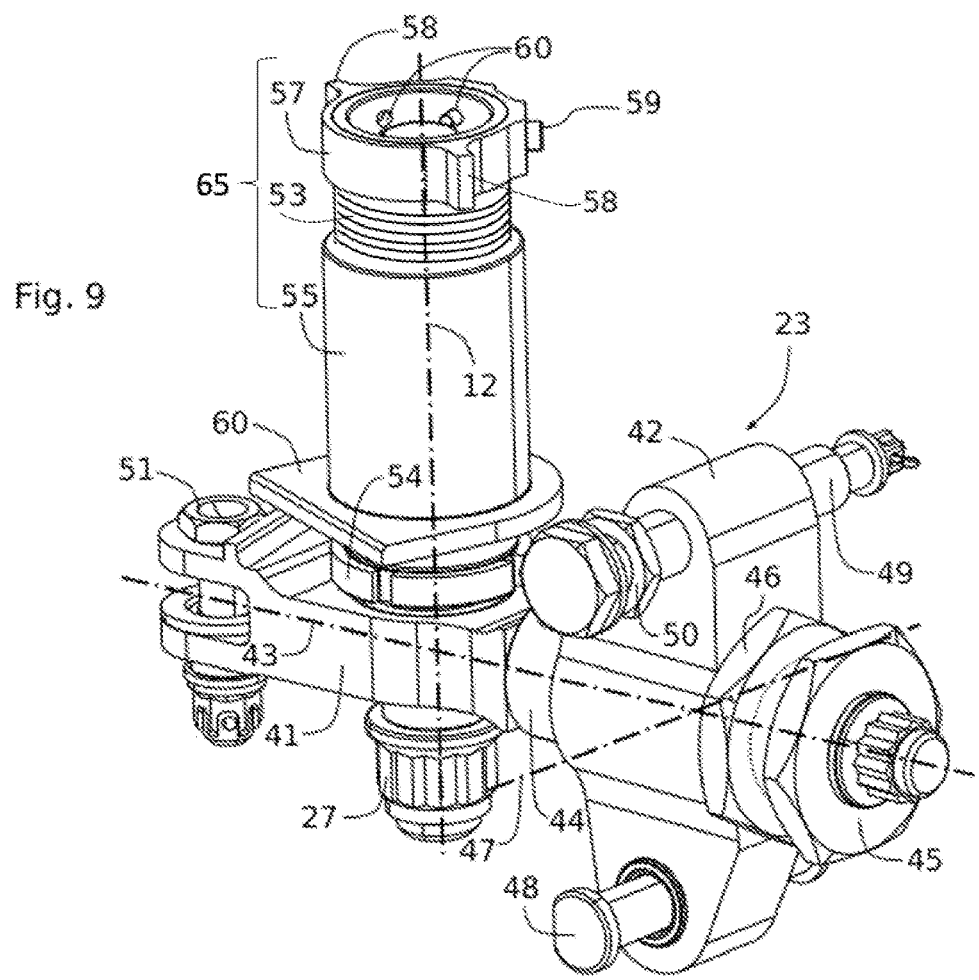
FIG. 9 shows elements of the lower hinge of the aircraft door of FIG. 4.

FIG. 9 shows a perspective view of the assembly formed by the lower pivot 27 and the lower fitting 23 of the lower hinge 14.

The lower hinge 14 has a make-up in part similar to the upper hinge 13. The lower hinge 14 thus has a lower pivot 27 mounted on a lower yoke 41 in such a way that this pivot 27 is aligned with the third pivot axis 12. The lower yoke 41 is adjustable in translation with respect to a lower shoe 42, in a direction of first translation 43, by virtue of a threaded rotating portion 44 that can be actuated in rotation by means of a hexagonal head 45. The threaded rotating portion 44 can be blocked by a counter-nut 46.

The lower shoe 42 is also adjustable in translation in a direction of second translation 47, orthogonal to the direction of first translation 43, by virtue of a guide shaft 48 on which the lower shoe 42 is mounted by a sliding fit, and by virtue of an adjustment screw 49 which is mounted rotatably on the lower base 21 and is in helical connection with the lower base 21. A counter-nut 50 is also provided to block the lower shoe 42 in position along this direction of second translation 47.

The lower hinge 14 can thus be adjusted in translation:
along the direction of first translation 43 by acting on the hexagonal head 45;
along the direction of second translation 47 by acting on the adjustment screw 49.

The lower yoke 41 of this lower hinge 14 moreover has a pivot 51 intended for mounting the pivot link 16. The adjustment of the hinge 14 thus acts directly on the support arm 6 and on the pivot link 16. Given the simple pivot connections relating to the support forearm 9, the pivoting front link 19 and the leaf 5, the adjustment of the hinge 14 thus acts on the positioning of the support arm 6, of the support forearm 9, of the pivoting link 16, of the pivoting front link 19 and of the leaf 5.

The lower pivot 27 moreover has means for adjusting the position of the support arm 6 along the third pivot axis 12. These adjustment means are illustrated in more detail in FIG. 10, which is an enlarged view of box X of FIG. 7, and FIG. 11, which is a section of the lower pivot 27.

The lower pivot 27 has a central shaft 52 on which a threaded cylinder 53 is mounted rotatably by means of a roller or ring mounting. This threaded cylinder 53 has a crown 54 for causing the rotation of the threaded cylinder 53 on the central shaft 52 by virtue of a hook wrench. An internally threaded sleeve 55 is screwed onto the threaded cylinder 53. The internally threaded sleeve 55 is also fixed on the support arm 6, at the level of a lower bearing 56. A support plate 60 rigidly connected to the internally threaded sleeve 55 allows recovery of forces associated with the weight of the support arm 6 toward the pivot 27.

The position of the support arm 6 in translation along the third pivot axis 12 can thus be adjusted by rotating the crown 54 in order to cause the internally threaded sleeve 55 to move up or down along the threaded cylinder 53.

Figure 10:
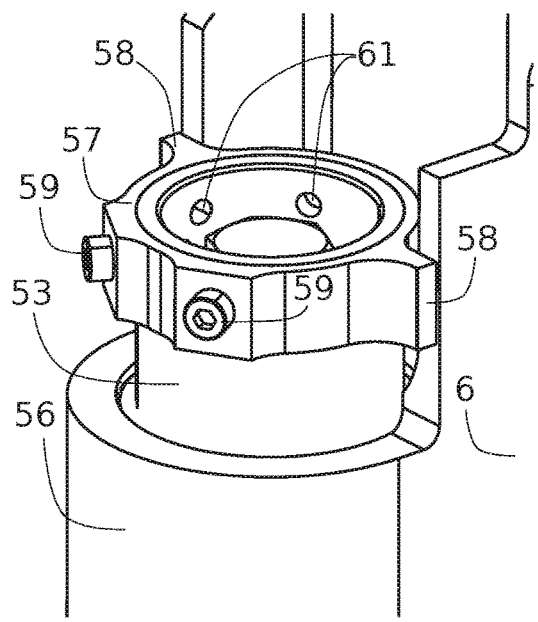
FIG. 10 is an enlarged view of the box X of FIG. 7.
Figure 11:
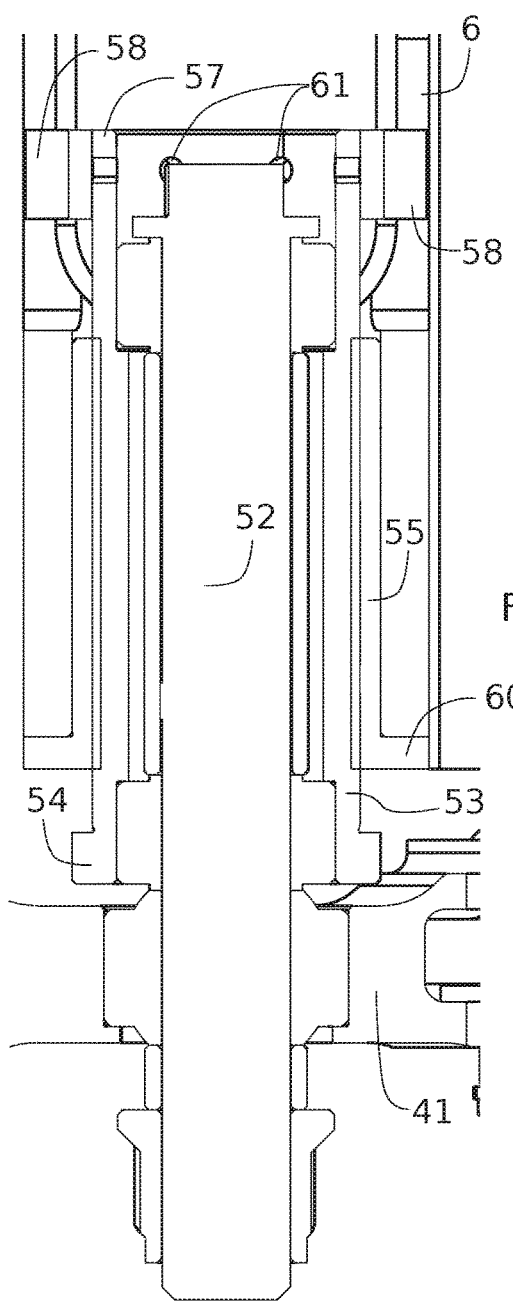
FIG. 11 is a partial sectional view of the lower hinge shown in FIG. 9.

The lower pivot 27 moreover has a flange 57 allowing the threaded cylinder 53 to be stopped in rotation with respect to the internally threaded sleeve 55 (see FIGS. 10 and 11). The flange 57 has two lugs 58 for locking in rotation against the support arm 6. The flange 57 has means for locking in rotation on the threaded cylinder 53, for example screws 59 cooperating with holes 61 formed in the threaded cylinder 53. By virtue of the flange 57, the lower pivot 27 has a disengageable helical connection with the support arm 6.

To adjust the height position of the support arm 6 along the third pivot axis 12, the flange 57 is withdrawn, and then the adjustment is made by acting on the crown 54. Once the correct height for the support arm 6 has been set on the pivot 27, this adjustment is blocked by replacing the flange 57, which locks the adjustment.

During the assembly of the aircraft door 3, the various elements of the door are mounted on the frame 4, then the door is adjusted such that, in the closed position, the outer wall 18 is perfectly in alignment with the fuselage 1 of the aircraft and the gaskets are regularly compressed to ensure the tightness of the aircraft door. This adjustment is carried out with the following adjustment movements:

the translation, along the third pivot axis 12, of the assembly formed by the support arm 6, the support forearm 9 and the leaf 5; by acting on the crown 54; this adjustment movement here regulates the height of the leaf 5 with respect to the fuselage;

the translation, along a direction parallel to the longitudinal axis of the aircraft, of the assembly formed by the support arm 6, the support forearm 9, the pivoting link 16, the pivoting front link 19 and the leaf 5; by acting identically on the upper hexagonal head 34 and lower hexagonal head 45, that is to say by moving the upper yoke 31 and the lower yoke 41 by the same distance along their direction of first translation 35, 43; this adjustment movement here regulates the lateral position of the leaf 5 with respect to the fuselage;

the translation, along a direction transverse to the aircraft, of the assembly formed by the support arm 6, the support forearm 9, the pivoting link 16, the pivoting front link 19 and the leaf 5; by acting identically on the upper adjustment screw 39 and the lower adjustment screw 49, that is to say by moving the upper shoe 32 and the lower shoe 42 by the same distance along their direction second translation 37, 47; this adjustment movement here regulates the recessing of the leaf 5 with respect to the fuselage;

the rotation around an axis parallel to the longitudinal axis of the aircraft by actuating in rotation only the upper adjustment screw 39 or the lower adjustment screw 49, or by actuating these screws 39, 49 in opposite directions; this adjustment movement here regulates the leaf 5 with respect to the fuselage, in rotation about a horizontal axis parallel to the leaf 5;

the rotation, around an axis transverse to the aircraft, of the assembly formed by the support arm 6, the support forearm 9, the pivoting link 16, the pivoting front link 19 and the leaf 5; by acting on only one of the two hexagonal heads 34, 45, or by actuating them in the opposite direction to each other; this adjustment movement here regulates the leaf 5 with respect to the fuselage, in rotation about a horizontal axis orthogonal to the outer wall of the leaf 5.

Thus, the hinges 13, 14 by themselves allow the adjustment of the leaf 5 according to five of the six possible degrees of freedom. The rotation of the leaf 5 about a vertical axis (the sixth degree of freedom, which is not adjustable by the hinges 13, 14) does not require adjustment since the door is maneuvered by rotation about the first pivot axis 8, the second pivot axis 11 and the third pivot axis 12.

The adjustment of the aircraft door can thus be carried out in three directions of translation and two axes of rotation by acting only on the upper hinge 13 and the lower hinge 14. This adjustment acts on both the support arm 6 and the leaf 5. As regards the lower hinge 14, the movement of the lower yoke 41 also causes the movement of the pivot 51 and therefore of the pivoting link 16. This adjustment is rapid and can be easily carried out by one person on their own.

Alternative embodiments of the aircraft door may be envisioned without departing from the scope of the invention. For example, means for adjustment along the directions of the first and second translations may be different than those described here; for example, they may include guide rails and slides associated with locking means.

The invention claimed is:

1. An aircraft door having:
    a leaf (5) comprising a door structure (17) to which an external wall (18) is fixed;
    a surround comprising a door frame (4) intended to be fixed to the fuselage (1) of the aircraft;
    a support arm (6) of the leaf (5) having an end mounted pivotably on the door frame (4), the support arm (6) being movable between a closed position, in which the leaf (5) closes the door frame (4), and an open position, in which the leaf (5) is released from the door frame (4);
    wherein the support arm (6) is connected to a support forearm (9) by a first pivot connection (7), permitting as sole degree of freedom a rotation between the support forearm (9) and the support arm (6) about a first pivot axis (8), the support forearm (9) being connected to the leaf (5) by a second pivot connection (10), permitting as sole degree of freedom a rotation between the leaf (5) and the support forearm (9) about a second pivot axis (11) parallel to the first pivot axis (8);

wherein the support arm (6) is connected to the door frame (4) by two hinges (13, 14), each of them having a pivot (26, 27) for rotation of the support arm (6) about a third pivot axis (12), which is parallel to the first pivot axis (8) and to the second pivot axis (11), this pivot (26, 27) from each hinge (13, 14) being connected to the door frame (4) by a fitting (22, 23) that is adjustable in translation in a direction of first translation (35, 43) and in a direction of second translation (37, 47), these two directions (35, 37, 43, 47) being orthogonal to each other and orthogonal to the third pivot axis (12);

wherein the rotation pivots (26, 27) of the support arm (6) are adjustable in translation along the third pivot axis (12); and wherein the two hinges (13, 14) are aligned on the support arm (6) in such a way that the rotation pivots (26, 27) of the support arm (6) are aligned along the third pivot axis (12).

2. The aircraft door as claimed in claim 1, wherein the rotation pivot (26) of the support arm (6) of one (13) of the hinges has a sliding shaft (30) with which the support arm (6) is in sliding pivot connection; and in that the rotation pivot (27) of the support arm (6) of the other hinge (14) is connected to the support arm (6) by a disengageable helical adjustment connection (65).

3. The aircraft door as claimed in claim 2, wherein said rotation pivot (27) of the support arm (6) of the other hinge (14) has: a central shaft (52) mounted on the adjustable fitting (23) and extending along the third pivot axis (12); a threaded cylinder (53) mounted rotatably on the central shaft (52); an internally threaded sleeve (55) screwed onto the threaded cylinder (53) and fixed to the support arm (6).

4. The aircraft door as claimed in claim 3, wherein the threaded cylinder (53) is stopped in rotation by a removable flange (57) coming into abutment against the support arm (6).

5. The aircraft door as claimed in claim 1, wherein the hinges (13, 14) each have a base (20, 21) fixed to the door frame (4), the adjustable fitting (22, 23) of each hinge (13, 14) being mounted in the corresponding base (20, 21).

6. The aircraft door as claimed in claim 1, wherein the adjustable fitting (22, 23) of each hinge (13, 14) passes through a wall of the door frame (4).

7. The aircraft door as claimed in claim 5, wherein the adjustable fitting (22, 23) of each hinge (13, 14) has a shoe (32, 42) mounted in the base (20, 21), and a yoke (31, 41) connecting the shoe (32, 42) to the rotation pivot (26, 27) of the support arm (6).

8. The aircraft door as claimed in claim 7, wherein the yoke (31, 41) of each hinge (13, 14) is adjustable in translation with respect to the shoe (32, 42), in a direction of first translation (35, 43) which is orthogonal to and intersects the third pivot axis (12).

9. The aircraft door as claimed in claim 7, wherein the yoke (31, 41) of each hinge (13, 14) is in helical connection with the shoe (32, 42).

10. The aircraft door as claimed in claim 9, wherein the yoke (31, 41) of each hinge (13, 14) has: a rotating threaded portion (33, 44) mounted in a threaded bore of the shoe (32, 42); and an actuation head (34, 45) accessible from the base (20, 21).

11. The aircraft door as claimed in claim 8, wherein the shoe (32, 42) of each hinge (13, 14) is adjustable in translation in a direction of second translation (37, 47) which is orthogonal to the third pivot axis (12) and to the direction of first translation (35, 43).

12. The aircraft door as claimed in claim 11, wherein the shoe (32, 42) is mounted on the base (20, 21) by way of:

a guide shaft (38, 48) extending parallel to the direction of second translation (37, 47);

an adjustment screw (39, 49), extending parallel to the direction of second translation (37, 47), which is in pivot connection with the base (20, 21) and which is in helical connection with the shoe (32, 42).

13. The aircraft door as claimed in claim 1, further including a pivoting link (16) and a pivoting front link (19) connected to each other by a pivot connection, and in that the adjustable fitting (23) of one (14) of the hinges has a pivot (51) for the pivoting link (16).

14. The aircraft door as claimed in claim 1, further including a mechanism of opening by lateral escape, all the parts connecting the leaf (5) to the door frame (4) being articulated solely by pivot connections along axes parallel to the first pivot axis (8).

* * * * *